United States Patent
Fukui

(10) Patent No.: US 11,541,818 B2
(45) Date of Patent: Jan. 3, 2023

(54) STORAGE DEVICE

(71) Applicant: TOYODA GOSEI CO., LTD., Kiyosu (JP)

(72) Inventor: Naoyuki Fukui, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 904 days.

(21) Appl. No.: 16/411,203

(22) Filed: May 14, 2019

(65) Prior Publication Data

US 2019/0381941 A1  Dec. 19, 2019

(30) Foreign Application Priority Data

Jun. 13, 2018 (JP) .............................. JP2018-113171

(51) Int. Cl.
*B60R 7/04* (2006.01)
*B60N 2/75* (2018.01)
*E05B 83/32* (2014.01)

(52) U.S. Cl.
CPC ................ *B60R 7/04* (2013.01); *B60N 2/793* (2018.02); *E05B 83/32* (2013.01); *E05Y 2900/538* (2013.01)

(58) Field of Classification Search
CPC ........... B60R 7/04; B60N 2/793; E05B 83/32; E05Y 2900/538
USPC .......................................... 220/826; 224/483
See application file for complete search history.

(56) References Cited

U.S. PATENT DOCUMENTS

2010/0090485 A1 * 4/2010 Cho ....................... B60N 2/793
                                                            16/337
2019/0276195 A1 * 9/2019 Nomoto ................... B60R 7/04

FOREIGN PATENT DOCUMENTS

JP         2006-290012 A      10/2006
JP         2009-248793 A      10/2009

OTHER PUBLICATIONS

Japanese Notification of Reasons for Refusal, dated Mar. 30, 2021, issued in corresponding Japanese Patent Application No. 2018-113171 (and English Machine Translation).

* cited by examiner

*Primary Examiner* — James N Smalley
(74) *Attorney, Agent, or Firm* — Posz Law Group, PLC

(57) ABSTRACT

A storage device 1 includes: a case member 2; a lid member 3 configured to change between a closed position, an opened position, and a half-opened position; a fin member 4 configured to be pivotally supported on the second end portion 32 of the lid member 3; a cover member 5 configured to be positioned so as to be fixed relative to the case member 2, and to be disposed backward of the lid member 3 on the back side; and an urging member 80. When the lid member 3 changes between the half-opened position and the opened position, the projecting tooth portions 46 of the fin member 4 are in sliding contact with the recessed groove portions 55 of the cover member 5 by urging force of the urging member 80.

2 Claims, 6 Drawing Sheets

STORAGE DEVICE

TECHNICAL FIELD

The present invention relates to a storage device used as, for example, a console box for a vehicle.

BACKGROUND ART

As a storage device, a storage device that includes a case member having an article storage portion that is opened upward, and a lid member that opens and closes the opening of the article storage portion, has been known. Ina standard storage device, the lid member changes, by, for example, sliding, rotating, or oscillating, between a closed position at which the opening of the article storage portion is closed and an opened position at which the opening thereof is opened. In recent years, a storage device in which a part of a lid member is disposed rearward of an article storage portion at the opened position in order to make the storage device compact, has also been suggested (for example, see JP2006290012(A)). Hereinafter, this type of storage device may be referred to as an inward-opening storage device, as appropriate.

JP2006290012(A) discloses an inward-opening storage device in which a door changes its state between an opened position and a closed position by rotating relative to a main body of a storage unit. Furthermore, the inward-opening storage device disclosed in JP2006290012(A) has a cover member disposed adjacent to the main body of the storage unit. The main body of the storage unit has a storage portion, and the door is disposed rearward of the storage portion at the opened position. More specifically, at this time, the door is disposed between the storage portion and the cover member. The door, the main body of the storage unit, and the storage portion in JP2006290012(A) correspond to a lid member, a case member, and an article storage portion, respectively, according to the present invention.

SUMMARY OF INVENTION

Technical Problem

As described in JP2006290012(A), in this type of inward-opening storage device, an article such as a coin may be inserted between the lid member and the cover member.

That is, it is assumed that various articles are stored in the article storage portion of the storage device, and, for example, when the storage device is a console box for a vehicle or the like, thin-plate-like or sheet-like articles such as various tickets and receipts, banknotes, and coins are likely to be stored in the article storage portion.

Such a thin article (hereinafter, referred to as "small article" as appropriate) may be inserted in a narrow gap between the cover member and the lid member. A small article which has been once inserted into such a gap is difficult to take out.

JP2006290012(A) suggests that a sweeping member is disposed at the end portion of the lid member on the cover member side, and the sweeping member sweeps out the article having been inserted in the gap. However, as shown in, for example, FIG. 2 in JP2006290012(A), if a gap is formed between the cover member and the sweeping member suggested in JP2006290012(A), a small article may be inserted into the gap, and even the sweeping member may not take out the small article.

The present invention is made in order to solve the aforementioned problem, and an object of the present invention is to provide a storage device that inhibits a small article from being inserted between a lid member and a cover member with enhanced effectiveness.

Solution to Problem

In order to solve the aforementioned problem, a storage device according to the present invention includes: a case member configured to have an article storage portion that is opened upward; a lid member configured to change, in a leading-back direction and an up-down direction, between a closed position at which the lid member closes an opening of the article storage portion so as to orient a first end portion toward a leading side and orient a second end portion toward a back side opposing the leading side, an opened position at which the lid member is disposed backward of the article storage portion on the back side so as to orient the first end portion upward and orient the second end portion downward, and a half-opened position between the opened position and the closed position; a fin member configured to have a comb-teeth-like portion in which a plurality of projecting tooth portions are aligned along a width direction that intersects the leading-back direction and the up-down direction so as to be spaced from each other, and to be pivotally supported on the second end portion of the lid member; a cover member configured to be positioned so as to be fixed relative to the case member, to have a plurality of recessed groove portions that mesh with the projecting tooth portions, and to be disposed backward of the lid member on the back side; and an urging member configured to be disposed in the lid member and to urge the fin member. When the lid member changes between the half-opened position and the opened position, the projecting tooth portions of the fin member are in sliding contact with the recessed groove portions of the cover member by urging force of the urging member.

Advantageous Effects of Invention

The storage device according to the present invention inhibits a small article from being inserted between the lid member and the cover member.

DESCRIPTION OF EMBODIMENTS

Figure 1:
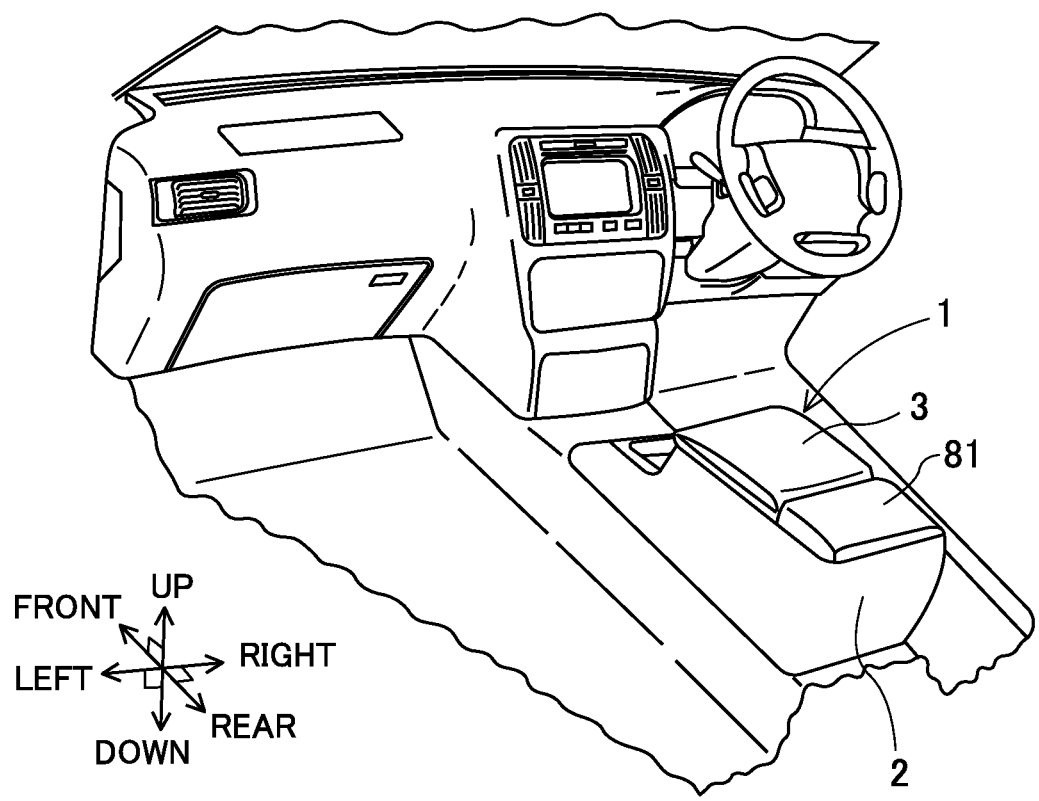
FIG. 1 is a perspective view schematically illustrating a storage device mounted to a vehicle, according to an example.

A storage device according to the present invention is described below.

The storage device according to the present invention may be used as a console box for a vehicle as described above. However, the usage of the storage device according to the present invention is not limited to such an example. Preferably, the storage device of the present invention may be, for example, a storage device which is used in a limited space such as a movie theater and modes of transportation such as a train and a passenger plane other than a vehicle.

The storage device of the present invention includes a case member, a lid member, a fin member, a cover member, and an urging member.

The case member has an article storage portion that is opened upward, and allows an article to be stored in the article storage portion.

The lid member changes between an opened position and a closed position in the leading-back direction and the up-down direction, and opens and closes the opening of the article storage portion.

More preferably, the lid member has a first end portion and a second end portion. The lid member closes the opening of the article storage portion at the closed position so as to orient the first end portion toward the leading side and orient the second end portion toward the back side opposing the leading side. In the description herein, the leading side and the back side oppose each other, and the leading side and the back side do not represent specific direction sides.

For example, when the storage device of the present invention is a console box for a vehicle, the leading side may be regarded as the front side in the vehicle advancing direction and the back side may be regarded as the rear side in the vehicle advancing direction. Meanwhile, the leading side may be regarded as the rear side in the vehicle advancing direction and the back side may be regarded as the front side in the vehicle advancing direction. Furthermore, the leading side may be regarded as one side in the vehicle width direction, that is, regarded as one of a driver seat side and a front passenger seat side, and the back side may be regarded as the other side in the vehicle width direction, that is, regarded as the other of the driver seat side and the front passenger seat side.

The first end portion and the second end portion of the lid member are not particularly limited. Since the lid member is disposed so as to orient the first end portion toward the leading side and orient the second end portion toward the back side at the closed position, the first end portion and the second end portion may be regarded as two end portions which are disposed so as to oppose each other.

The lid member is disposed so as to orient the first end portion upward and orient the second end portion downward at the opened position. At this time, the lid member is simultaneously disposed rearward of the article storage portion. Therefore, the storage device of the present invention may be regarded as an inward-opening storage device described above.

At the opened position, the lid member may be stored in the case member. Alternatively, at the opened position, a part of the lid member, specifically, a portion of the lid member on the first end portion side may be exposed upward of the case member. The lid member may be merely disposed rearward of the case member at the opened position.

The lid member changes between the opened position and the closed position in the leading-back direction and the up-down direction. When the position is changed, the lid member changes through a half-opened position between the opened position and the closed position. A mode in which the position of the storage device of the present invention changes is not particularly limited. For example, the position of the storage device may change by uniaxially or biaxially rotating, by sliding, or by combination of sliding and rotating.

The fin member has a comb-teeth-like portion having a plurality of projecting tooth portions, and is pivotally supported on the second end portion of the lid member. The fin member is pivotally supported on the lid member, whereby the position of the fin member changes integrally with the position of the lid member that changes between the opened position and the closed position, and the fin member is rotatable relative to the lid member.

The cover member is disposed rearward of the lid member, and has a plurality of recessed groove portions that mesh with the projecting tooth portions of the fin member described above. The fin member and the cover member have such structures, whereby the projecting tooth portions of the fin member are considered to move in the recessed groove portions when the lid member changes between the half-opened position and the opened position.

Therefore, at least when the lid member changes between the half-opened position and the opened position, a distance between the fin member and the cover member is considered to be shorter than a distance between the lid member and the cover member. At least when the lid member changes between the half-opened position and the opened position, the fin member is also considered to be positioned between the lid member and the cover member. That is, in the storage device of the present invention, the fin member interferes with a small article that is being inserted between the fin member and the cover member.

Furthermore, in the storage device of the present invention, the fin member has the comb-teeth-like portion, and the cover member has the recessed groove portions that mesh with the projecting tooth portions of the comb-teeth-like portion, whereby a gap between the fin member and the cover member almost zigzags such that elevations and depressions are continuous. Therefore, even a thin flat-plate-like small article such as a card or a coin is unlikely to be inserted into the gap between the fin member and the cover member.

In the comb-teeth-like portion of the fin member, the plurality of projecting tooth portions are aligned in the width direction so as to be spaced from each other. In the present invention, the width direction is the direction that intersects the leading-back direction and the up-down direction, that is, the direction that intersects a direction in which the position of the lid member changes.

Since the projecting tooth portions are aligned in the width direction, the gaps between the fin member and the cover member, that is, the gaps that form the almost zigzag shape described above are formed so as to be distanced in the direction that intersects the direction in which the position of the lid member changes. Therefore, a flat-plate-like small article such as a card or a coin is considered to be unlikely to be inserted into the gap between the fin member and the cover member.

Furthermore, the storage device of the present invention has the urging member that is provided in the lid member and urges the fin member. When the lid member changes between the half-opened position and the opened position, the projecting tooth portions of the fin member are in sliding contact with the recessed groove portions of the cover member by the urging force of the urging member. Therefore, the almost zigzag gap between the fin member and the cover member substantially disappears, and a small article is further inhibited from being inserted into the gap between the fin member and the cover member. Furthermore, when the gap between the fin member and the cover member substantially disappears, even a small article having, for example, a band-like shape and a small width is advantageously inhibited from being inserted into the above-described gap.

For example, when the position of the lid member changes in a complex manner by, for example, biaxial rotation or combination of sliding and rotating, a trajectory of the position change of the lid member is difficult to precisely control, unlike in a case where the position of the lid member changes by simple linear sliding or uniaxial rotation. Therefore, in such a case, the size of the gap between the lid member and the cover member, that is, a distance between the lid member and the cover member is unlikely to be maintained constant.

In the storage device of the present invention, the fin member is disposed between the lid member and the cover member, and the fin member is pivotally supported on the lid member, whereby an angle of the fin member relative to the lid member or the cover member is changed. By an angle of the fin member relative to the lid member or the cover member being changed, a distance between the fin member and the cover member is naturally changed. In the storage device of the present invention, even in the case where the size of the gap between the lid member and the cover member is not constant, the change of the size of the gap is absorbed by such a rotation of the fin member, and insertion of a small article into the gap between the fin member and the cover member is eventually inhibited with an enhanced reliability. That is, the function of the storage device of the present invention for inhibiting a small article from being inserted into the gap is more effective when the position of the lid member changes in a complex manner.

The storage device of the present invention may have components other than the various components described above. Examples of the other components include a guiding component for regulating the position of the lid member and guiding position change of the lid member, a locking component for locking the lid member at a proper position and/or time as appropriate, an opening driving component for driving opening of the lid member, a closing driving component for driving closing of the lid member, and a damper for attenuating a speed or force of the lid member when opening is driven and/or closing is driven. However, the other components are not limited thereto.

The storage device of the present invention is described below by using a specific example.

Unless otherwise specified, a numerical range "x to y" described herein includes a lower limit x and an upper limit y. The upper limit value and the lower limit value as well as numerical values described in the embodiment are optionally combined to provide a numerical range. A numerical value optionally selected from the numerical range may be used as the numerical value of the upper or lower limit.

Example

Figure 2:
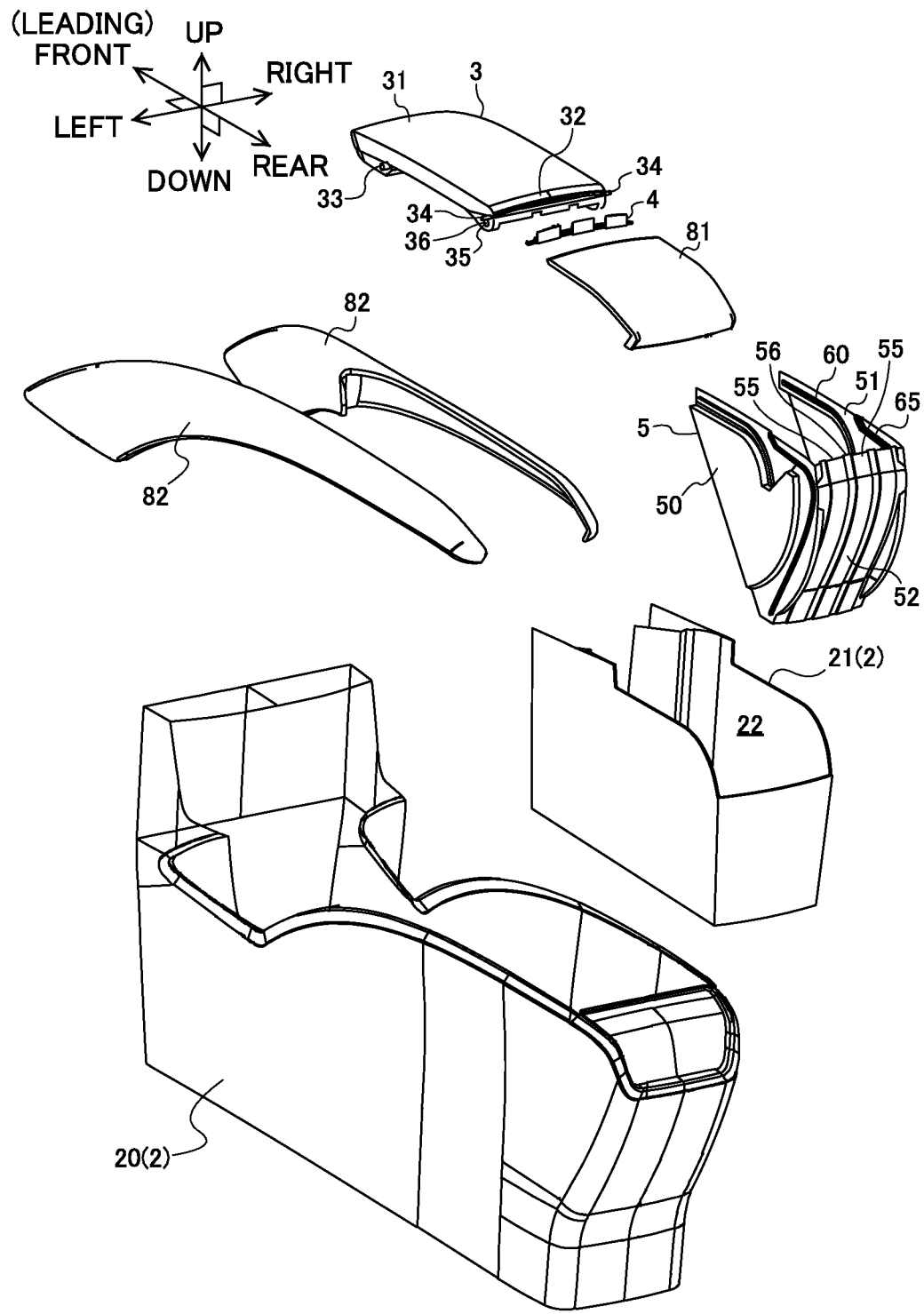
FIG. 2 is an exploded view schematically illustrating the storage device according to the example.

A storage device according to an example is a specific example of the storage device of the present invention used as a console box for a vehicle. FIG. 1 is a perspective view schematically illustrating the storage device mounted to a vehicle, according to the example. FIG. 2 is an exploded view schematically illustrating the storage device according to the example. FIG. 3 and FIG. 5 to FIG. 8 illustrate an operation of the storage device according to the example.

Figure 4:
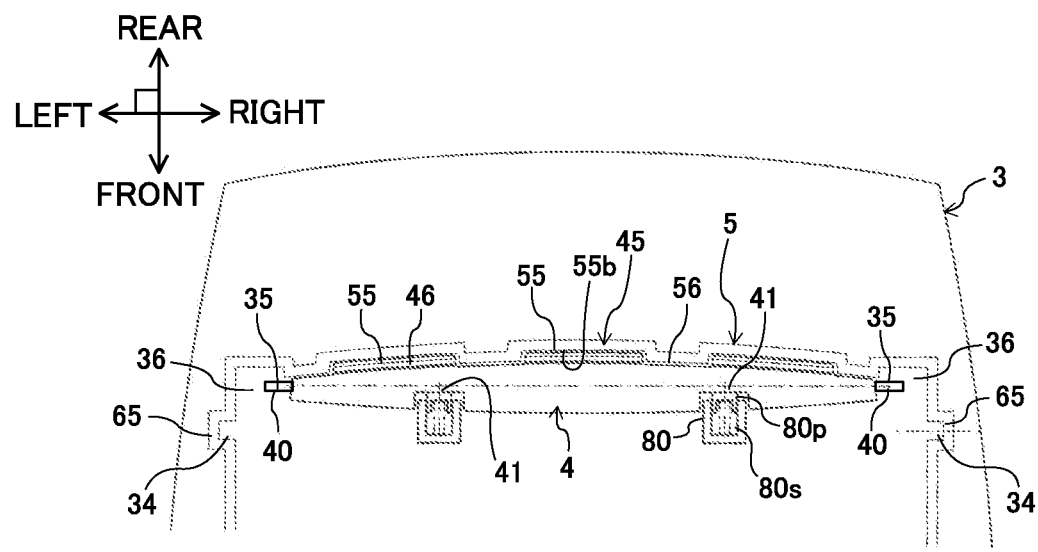
FIG. 4 schematically illustrates a lid member, a fin member, an urging member, and a cover member of the storage device according to the example.

FIG. 4 schematically illustrates a lid member, a fin member, an urging member, and a cover member of the storage device according to the example.

Hereinafter, in the example, up, down, left, right, front, and rear represent up, down, left, right, front, and rear, respectively, in the drawings. Among them, particularly, "front" and "rear" correspond to "leading" and "back", respectively, described above.

A storage device 1 according to the example is implemented as a console box for a vehicle. The storage device 1 is disposed between a driver seat and a front passenger seat in the vehicle interior as shown in FIG. 1.

As shown in FIG. 2, the storage device 1 according to the example includes a case member 2, a lid member 3, a fin member 4, a cover member 5, a rear cover 81, and two side covers 82, and further includes an urging member 80, a locking component, and a closing driving component which are described below.

The case member 2 has a double-box structure that includes an outer case 20 and an inner case 21. The inner case 21 is mounted inside the outer case 20, and an article storage portion 22 is formed inside the inner case 21 so as to be opened upward. The left and right side portions on the upper surface of the case member 2 are covered by the side covers 82, respectively.

Figure 3:
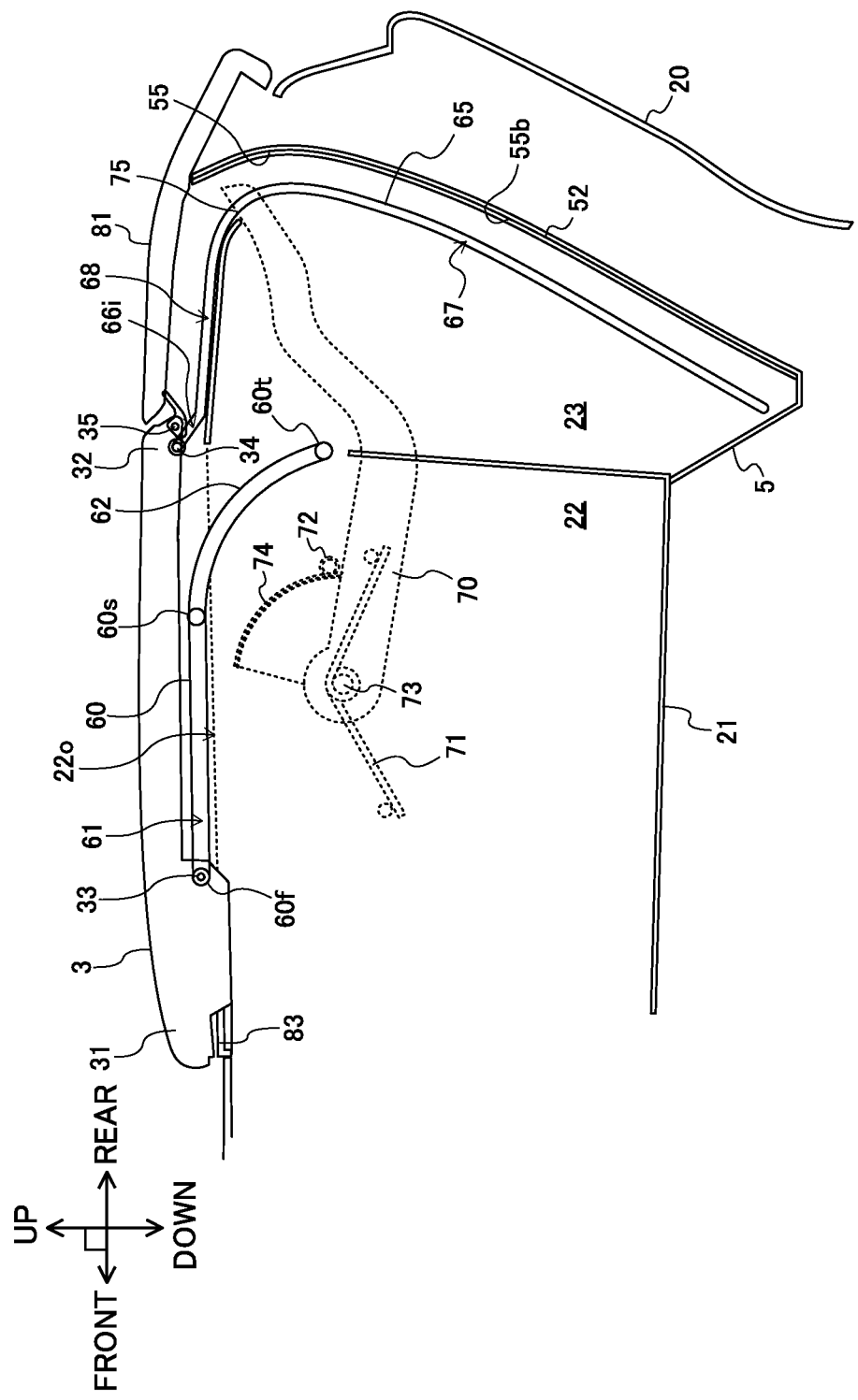
FIG. 3 illustrates an operation of the storage device according to the example.

As shown in FIG. 3, a gap is formed between the inner case 21 and the outer case 20 in the rear portion of the case member 2. The cover member 5 is inserted in the gap and fixed relative to the outer case 20 and the inner case 21.

A lid storage portion 23 is formed between the cover member 5 and the inner case 21.

The rear cover 81 is disposed above the cover member 5 in the rear portion of the case member 2. The rear cover 81 covers the cover member 5 and the gap between the inner case 21 and the outer case 20, and is fixed relative to the outer case 20 and the inner case 21.

As shown in FIG. 2, the cover member 5 has an almost U-shaped-screen-like shape that includes a left wall 50 and a right wall 51, and a rear wall 52 connecting between the left wall 50 and the right wall 51. In each of the left wall 50 and the right wall 51 of the cover member 5, a long-groove-shaped front-side guide rail portion 60 and a long-groove-shaped rear-side guide rail portion 65 are formed.

The rear wall 52 of the cover member 5 has three recessed groove portions 55 that extend in the front-rear direction and the up-down direction so as to be curved. The recessed groove portions 55 are each opened forward, and are aligned along the left-right direction so as to be spaced from each other. The recessed groove portions 55 adjacent to each other are connected by a general wall portion 56. As shown in FIG. 4, a rear groove wall 55b of the recessed groove portion 55 is disposed rearward of the general wall portion 56. The front-side guide rail portions 60 and the rear-side guide rail portions 65, and front-side pins 33 and rear-side pins 34 described below form a guiding component.

As shown in FIG. 3, the front-side guide rail portion 60 is disposed almost forward of the rear-side guide rail portion 65.

The front-side guide rail portion 60 includes a front-side slide guide portion 61 and a front-side rotation guide portion 62. The front-side slide guide portion 61 is disposed close to the upper end side of the case member 2 and extends in the front-rear direction. The front-side rotation guide portion 62 connects with the rear end portion of the front-side slide guide portion 61 and extends downward so as to form an almost arc-like shape. The front-side rotation guide portion 62 and the front-side slide guide portion 61 are smoothly continuous with each other.

In each front-side guide rail portion 60, a first locking hole 60f, a third locking hole 60t, and a second locking hole 60s are formed at the front end portion, the rear end portion, and the almost center portion in the front-rear direction, respectively. In each of the first locking hole 60f, the second locking hole 60s, and the third locking hole 60t, the groove depth of the front-side guide rail portion 60 is greater than the groove depths of other portions thereof. The locking component is formed by the first locking hole 60f, the third locking hole 60t, and the second locking hole 60s together with an operation knob 83, the front-side pin 33, and a not-illustrated lock link which are described below.

Each rear-side guide rail portion 65 includes a rear-side slide guide portion 66 and a rear-side rotation guide portion 67. The rear-side slide guide portion 66 is disposed rearward of the front-side guide rail portion 60, is disposed close to the upper end side of the case member 2, and extends in the almost front-rear direction. The rear-side rotation guide portion 67 is continuous with the rear end portion of the rear-side slide guide portion 66 and extends downward.

The front end portion of the rear-side slide guide portion 66 forms an introduction portion 66i that is tilted from the upper front side toward the lower rear side. The other portion of the rear-side slide guide portion 66 extends in an almost linear manner.

A portion, of the rear-side rotation guide portion 67, disposed at the boundary between the rear-side slide guide portion 66 and the rear-side rotation guide portion 67 is curved and smoothly continuous with the rear-side slide guide portion 66. The curvature of the lower side portion of the rear-side rotation guide portion 67 is less than the curvature of the upper side portion of the rear-side rotation guide portion 67, that is, less than the curvature of a portion, of the rear-side rotation guide portion 67, disposed at the boundary between the rear-side slide guide portion 66 and the rear-side rotation guide portion 67. The lower side portion of the rear-side rotation guide portion 67 is considered to extend in an almost linear manner. Furthermore, the lower side portion of the rear-side rotation guide portion 67 extends downward so as to be far beyond the lower end portion of the front-side rotation guide portion 62.

As shown in FIG. 2, the lid member 3 is almost plate-shaped. The lid member 3 has two front-side pins 33 and two rear-side pins 34. Each of the front-side pins 33 is attached on a first end portion 31 side of the lid member 3 so as to be slidable relative to the lid member 3 in the left-right direction. Each of the front-side pins 33 is urged by a not-illustrated pin urging member. The pin urging member urges one of the front-side pins 33 in a direction in which the one of the front-side pins 33 projects leftward from the left side surface of the lid member 3, and urges the other of the front-side pins 33 in a direction in which the other of the front-side pins 33 projects rightward from the right side surface of the lid member 3.

As shown in FIG. 3, each of the front-side pins 33 is inserted in the front-side guide rail portion 60, and is movable in the front-side guide rail portion 60.

Each of the front-side pins 33 is connected to the operation knob 83 through the not-illustrated lock link. The operation knob 83 is pivotally supported on the lid member 3 and oscillates relative to the lid member 3. The operation knob 83 is urged toward a predetermined position by a not-illustrated lock urging member. When the operation knob 83 is at the predetermined position, one of the front-side pins 33 projects leftward from the left side surface of the lid member 3 by an urging force of the above-described pin urging member, and the other of the front-side pins 33 projects rightward from the right side surface of the lid member 3 by an urging force of the above-described pin urging member. When the operation knob 83 oscillates, force is transmitted to each of the front-side pins 33 through the not-illustrated lock link, and each of the front-side pins 33 slides against the urging force of the pin urging member so as to retract toward the lid member 3.

Each of the rear-side pins 34 is fixed integrally to the lid member 3 on a second end portion 32 side of the lid member 3. One of the rear-side pins 34 projects leftward from the left side surface of the lid member 3, and the other of the rear-side pins 34 projects rightward from the right side surface of the lid member 3.

Each of the rear-side pins 34 is inserted in the rear-side guide rail portion 65, and is movable in the rear-side guide rail portion 65.

As shown in FIG. 2 and FIG. 4, the second end portion 32 of the lid member 3 include two fin holding portions 35. Tab-like fin holding base portions 36 are disposed at the left end portion and the right end portion of the second end portion 32 of the lid member 3. The fin holding portions 35 are formed in the fin holding base portions 36, respectively, and each fin holding portion 35 has a hole-like shape that extends in the left-right direction.

The fin member 4 is pivotally supported by the fin holding portions 35 of the lid member 3.

As shown in FIG. 4, the fin member 4 has an almost blade-like shape that extends in the left-right direction as a whole, and includes two shaft portions 40, two input portions 41, and a comb-teeth-like portion 45.

The two shaft portions 40 are disposed at the left and right end portions, respectively, of the fin member 4, and are pivotally supported by the fin holding portions 35 of the lid member 3. Therefore, the fin member 4 rotates about the shaft portions 40.

The two input portions 41 are aligned along the left-right direction so as to be spaced from each other. The comb-teeth-like portion 45 has three projecting tooth portions 46 each of which is formed in a squeegee-like shape having its width narrowed toward the end portion. The projecting tooth portions 46 are aligned along the left-right direction so as to be spaced from each other. In general, the fin member 4 is disposed so as to orient the input portions 41 toward the front side and orient the comb-teeth-like portion 45 toward the rear side.

Figure 5:
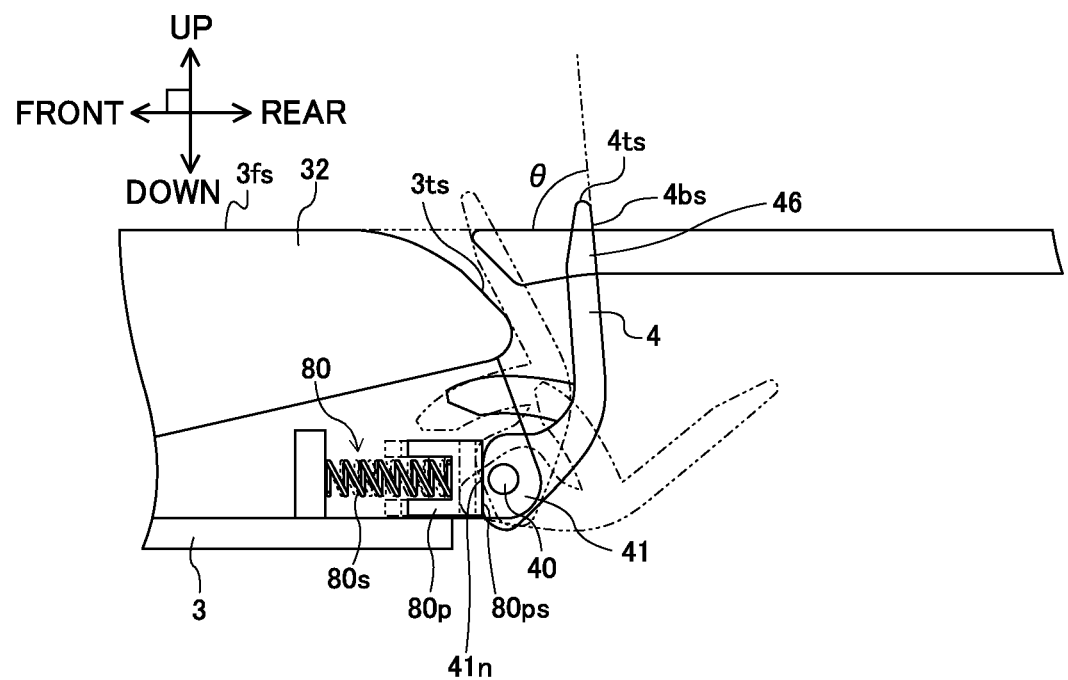
FIG. 5 illustrates an operation of the storage device according to the example.

As shown in FIG. 5, a distance from the shaft portion 40 to the surface of the input portion 41 is different for each portion of the input portion 41 in the circumferential direction around the shaft portion 40. The cross-section obtained by the input portion 41 being cut at the plane orthogonal to the shaft portion 40 is considered to have different diameters around the shaft portion 40. On the surface of the input portion 41, a portion where a distance from the shaft portion 40 is shortest is referred to as a neutral input portion 41n.

The urging members 80 are disposed on the front sides of the input portions 41, respectively. The urging member 80 is fixed to the lid member 3, and includes a helical-spring-like urging portion 80s, and a pressing portion 80p that is integrated with the urging portion 80s. The pressing portion 80p has a planar pressing surface 80ps.

The urging portion 80s is compressed to accumulate urging force, and extends to release the accumulated urging force. The urging portion 80s is attached to the lid member 3 in a slightly compressed state, whereby the urging member 80 presses the input portion 41 by the pressing surface 80ps.

As described above, a distance from the shaft portion 40 to the surface of the input portion 41 is different for each portion of the input portion 41. A distance between the surface of the input portion 41 and the shaft portion 40 is shortest at the neutral input portion 41n.

Accordingly, the urging member 80 that presses the input portion 41 contacts with the neutral input portion 41n in the most stable state, that is, in a state where the urging force accumulated in the urging portion 80s is lowest, as indicated by a solid line in FIG. 5. A position of the fin member 4 in a state where the neutral input portion 41n contacts with the urging member 80 is referred to as a neutral position.

The fin member 4 rotates about the shaft portions 40. When the fin member 4 rotates, the position at which the input portion 41 contacts with the urging member 80 is changed. When a portion of the input portion 41 other than the neutral input portion 41n contacts with the urging member 80, compression of the urging portion 80s is increased, and the urging force accumulated in the urging member 80 is increased.

The urging member 80 presses the input portion 41 by the urging force, whereby the fin member 4 is prompted to rotate up to a position at which the neutral input portion 41n contacts with the urging member 80, that is, rotate up to the neutral position. Therefore, the urging member 80 is considered to urge the fin member 4 toward the neutral position.

In the storage device 1 according to the example, an angle θ of the fin member 4 at the neutral position relative to the lid member 3 is about 85°. The angle θ is more specifically an angle (minor angle) between a surface 3fs of the lid member 3 and a rear surface 4bs of the fin member 4.

In the description herein, the surface 3fs of the lid member 3 represents a surface that is included in the lid member 3, is oriented upward at a closed position described below, and is oriented toward the cover member 5 at a position from the half-opened position to the opened position. A front end surface 3ts of the lid member 3 is not included in the surface 3fs. When the surface 3fs of the lid member 3 is curved, the plane that contacts with the surface 3fs adjacent to the front end surface 3ts is regarded as the surface 3fs of the lid member 3.

In the description herein, the rear surface 4bs of the fin member 4 represents a surface which is included in the projecting tooth portion 46 of the fin member 4, and is oriented toward the side opposite to the lid member 3 side at the neutral position. A front end surface 4ts of the projecting tooth portion 46 is not included in the rear surface 4bs. When the rear surface 4bs of the fin member 4 is curved, the plane that contacts with the rear surface 4bs adjacent to the front end surface 4ts is regarded as the rear surface 4bs of the fin member 4.

In the description herein, the angle θ between the surface 3fs of the lid member 3 and the rear surface 4bs of the fin member 4 is referred to as an angle of the fin member 4 relative to the lid member 3.

As shown in FIG. 3, the storage device 1 according to the example further includes the closing driving component that has a closing driving arm 70, a closing urging member 71, and a damper 72.

The closing driving arm 70 has an arm shaft portion 73 that is pivotally supported on the inner case 21, and the closing driving arm 70 is rotatable about the arm shaft portion 73. The closing urging member 71 is torsion-spring-shaped, and is attached externally to the arm shaft portion 73. One end of the closing urging member 71 is attached to the inner case 21 and the other end thereof is attached to the closing driving arm 70. The closing driving arm 70 has a gear portion 74 that is disposed so as to be coaxial with the arm shaft portion 73. The damper 72 is attached to the inner case 21, and meshes with the gear portion 74.

The end portion of the closing driving arm 70 on the side opposite to the arm shaft portion 73 side is referred to as a driving end portion 75. The driving end portion 75 is disposed upward and/or rearward of the rear-side guide rail portion 65. Therefore, the driving end portion 75 overlaps a part of the rear-side guide rail portion 65. The closing urging member 71 urges the closing driving arm 70 counterclockwise in FIG. 3.

An operation of the storage device 1 according to example is described below.

Figure 6:
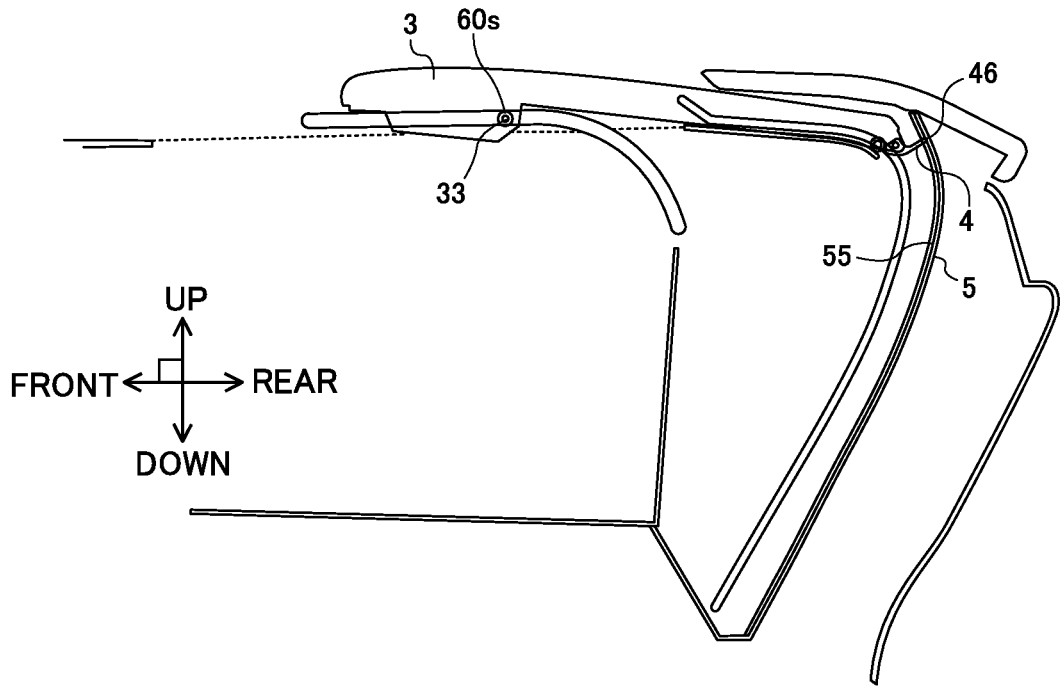
FIG. 6 illustrates an operation of the storage device according to the example.
Figure 7:
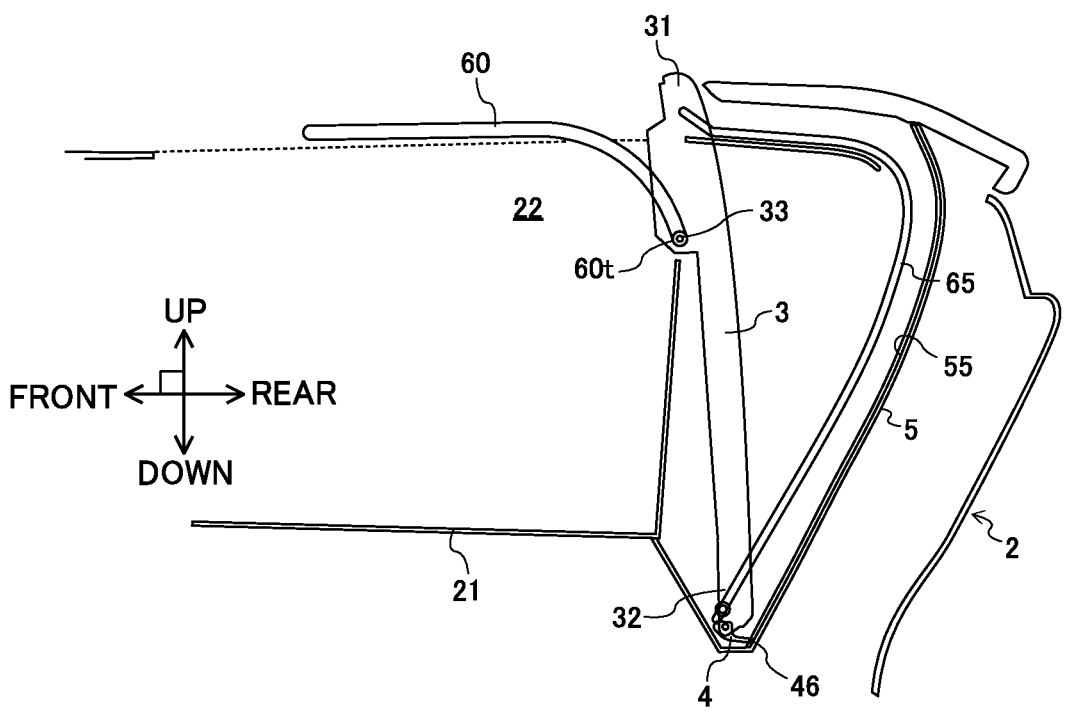
FIG. 7 illustrates an operation of the storage device according to the example.

The lid member 3 changes between the closed position (shown in FIG. 3), the opened position (shown in FIG. 7), and the half-opened position (shown in FIG. 6) in the front-rear direction and the up-down direction as shown in FIG. 3, FIG. 7, and FIG. 6.

Specifically, at the closed position shown in FIG. 3, the lid member 3 closes an opening 22o of the article storage portion 22 so as to orient the first end portion 31 toward the leading side, that is, toward the front side, and orient the second end portion 32 toward the rear side. At the opened position shown in FIG. 7, the lid member 3 is disposed so as to orient the first end portion 31 upward and orient the second end portion 32 downward. At this time, the lid member 3 is stored in the lid storage portion 23 formed in the case member 2 in a portion rearward of the article storage portion 22, that is, between the inner case 21 and the cover member 5.

As shown in FIG. 3, when the lid member 3 is at the closed position, each front-side pin 33 is disposed in the front end portion of the front-side guide rail portion 60, and inserted into the first locking hole 60f. In the first locking hole 60f, the second locking hole 60s, and the third locking hole 60t, the groove depth of the front-side guide rail portion 60 is greater than the groove depths of the other portions thereof. The front-side pin 33 is urged so as to project by a not-illustrated pin urging member. Therefore, the front-side pin 33 engages with the first locking hole 60f, and the lid member 3 is locked at the closed position.

At this time, the rear-side pin 34 is disposed in the front end portion of the rear-side guide rail portion 65, more specifically, disposed in the front end portion of the introduction portion 66i of the rear-side slide guide portion 66. The lid member 3 is disposed forward of the rear cover 81, and the lid member 3 and the rear cover 81 are disposed so as to be almost flush with each other.

In order to allow the lid member 3 to change from the closed position, and open the opening 22o of the article storage portion 22, the operation knob 83 is firstly operated to retract each front-side pin 33 toward the lid member 3. Thus, the front-side pin 33 is disengaged from the first locking hole 60f, and is movable in the front-side guide rail portion 60. That is, at this time, the lid member 3 is unlocked.

When the lid member 3 is pushed rearward in this state, the rear-side pin 34 moves rearward and downward in the introduction portion 66i of the rear-side slide guide portion 66, and the second end portion 32 of the lid member 3 is inserted downward of the rear cover 81. When the lid member 3 is further pushed rearward in this state, the front-side pin 33 moves rearward in the front-side slide guide portion 61 of the front-side guide rail portion 60, and the rear-side pin 34 moves rearward in the rear-side slide guide portion 66 of the rear-side guide rail portion 65. Therefore, the lid member 3 slides rearward, and is disposed at the half-opened position shown in FIG. 6.

At this time, the projecting tooth portions 46 of the fin member 4 are inserted into the recessed groove portions 55 of the cover member 5. The projecting tooth portions 46 are pressed toward the recessed groove portions 55 by the urging force of the urging member 80.

When the lid member 3 reaches the half-opened position shown in FIG. 6, the front-side pin 33 is inserted into the second locking hole 60s. Therefore, the lid member 3 is locked at the half-opened position. The lid member 3 locked at the half-opened position is unlocked in the same manner as the manner in which the lid member 3 locked at the closed position is unlocked as described above.

Figure 8:
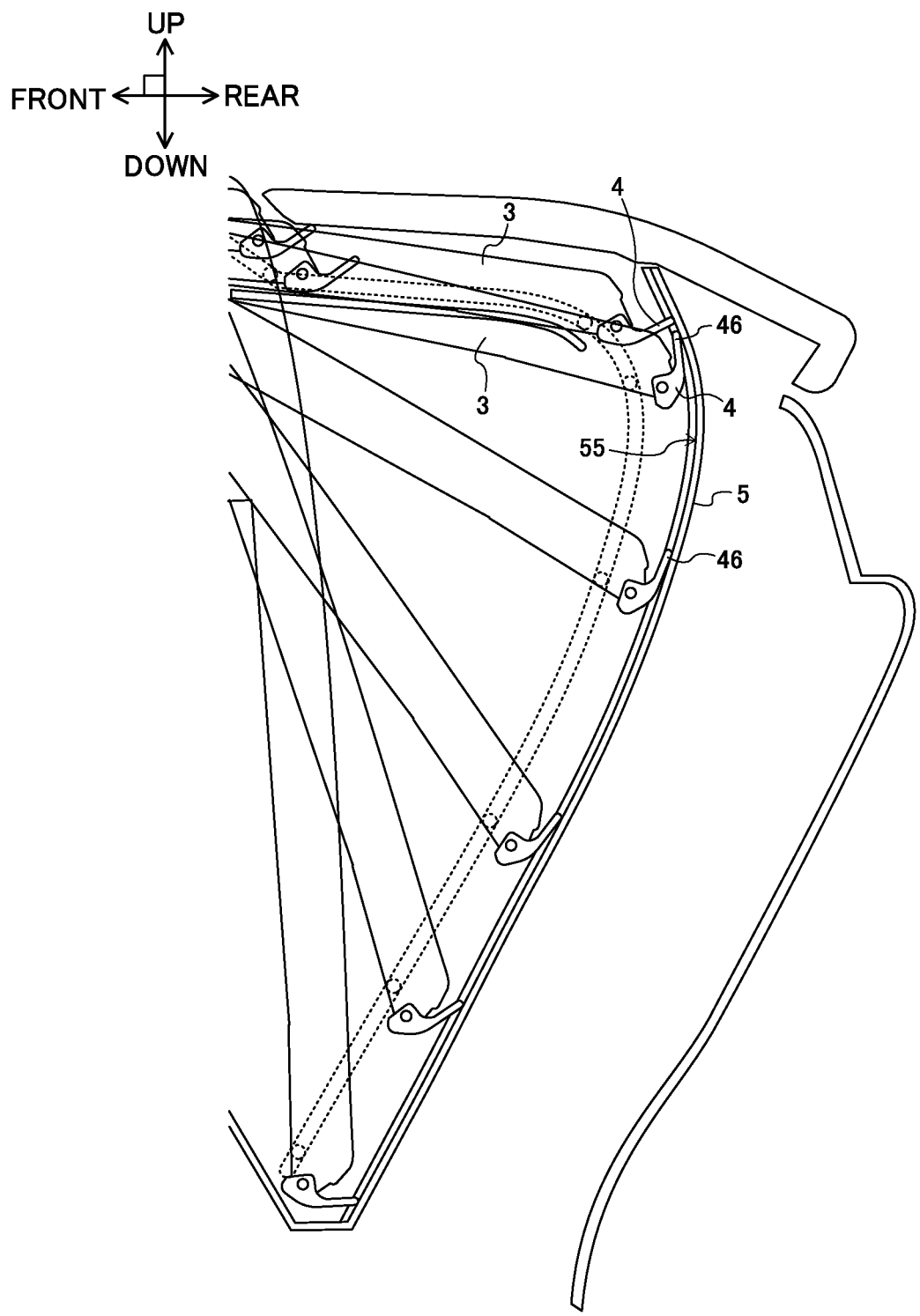
FIG. 8 illustrates an operation of the storage device according to the example.

The lid member 3 rotates biaxially about the front-side pins 33 and the rear-side pins 34 from the half-opened position shown in FIG. 6 toward the opened position shown in FIG. 7, whereby the position is changed in the front-rear direction and the up-down direction. Accordingly, the trajectory of the lid member 3 that changes between the half-opened position and the opened position is compact as shown in FIG. 8.

As shown in FIG. 3, the driving end portion 75 of the closing driving component overlap a part of the rear-side guide rail portion 65. The rear-side pin 34 is inserted in the rear-side guide rail portion 65, and the rear-side pin 34 is constantly disposed upward and/or forward of the driving end portion 75.

Therefore, when the lid member 3 changes from the half-opened position toward the opened position, the rear-side pin 34 presses the driving end portion 75 downward and rearward, the closing driving arm 70 rotates clockwise in FIG. 3, and urging force is accumulated in the closing urging member 71.

When the lid member 3 reaches the opened position, the front-side pin 33 is inserted into the third locking hole 60t. Therefore, the lid member 3 is locked at the opened position. By the lid member 3 being locked at the opened position, the rear-side pin 34 disposed in the lid member 3 keeps the driving end portion 75 pressed, and the closing urging member 71 of the closing driving component also keeps the urging force accumulated therein.

The lid member 3 locked at the opened position is unlocked in the same manner as the manner in which the lid member 3 locked at the closed position is unlocked as described above. When the lid member 3 has been unlocked, the position of the lid member 3 is changeable, and the closing urging member 71 of the closing driving component releases the urging force. Therefore, the closing driving arm 70 rotates counterclockwise in FIG. 3, the driving end portion 75 of the closing driving arm 70 presses the rear-side pin 34 upward and forward, and the position of the rear-side pin 34 changes upward and forward. The lid member 3 changes from the opened position to the half-opened position according to the position of the rear-side pin 34 being changed.

That is, the lid member 3 of the storage device 1 according to the example automatically closes from the opened position to the half-opened position by using the closing driving component. The speed of the closing operation of the lid member 3, that is, the speed of rotation of the closing driving arm 70 is reduced by the damper 72.

When the lid member 3 is unlocked, and the lid member 3 changes between the half-opened position and the opened position, a gap is formed between the lid member 3 and the rear cover 81 as shown in FIG. 7. Through the gap, a gap between the lid member 3 and the cover member 5 is exposed to the outside. Therefore, in some cases, a small article may be inserted into the gap between the lid member 3 and the cover member 5 at this time.

In the storage device 1 according to the example, the fin member 4 is disposed between the lid member 3 and the cover member 5, and the projecting tooth portions 46 of the fin member 4 are inserted into the recessed groove portions 55 of the cover member 5 when the lid member 3 changes from the half-opened position to the opened position, as shown in FIG. 4. Therefore, the gap between the lid member 3 and the cover member 5 is disconnected in the left-right direction at this time. Therefore, only a small article having a small width is inserted into the gap.

Since the projecting tooth portions 46 are pressed toward the recessed groove portions 55, when the lid member 3 changes between the half-opened position and the opened position, the projecting tooth portions 46 are in sliding contact with the recessed groove portions 55. Therefore, the gap between the lid member 3 and the cover member 5 becomes very narrow in the front-rear direction, whereby a small article is further inhibited from being inserted into the gap.

That is, the storage device 1 according to the example and the storage device according to the present invention inhibit a small article from being inserted into the gap between the lid member 3 and the cover member 5.

For example, when the lid member 3 changes from the half-opened position to the opened position, even if a small article is inserted into the gap between the lid member 3 and the cover member 5, the projecting tooth portions 46 of the fin member 4 are in sliding contact with the recessed groove portions 55 as shown in FIG. 6 and FIG. 7, a lower region in the gap is blocked by the projecting tooth portions 46, and the small article is unlikely to be inserted into a portion downward of the projecting tooth portions 46.

The small article having been inserted into the gap is swept upward by the projecting tooth portions 46 when the lid member 3 changes from the opened position toward the half-opened position. Therefore, the storage device 1 according to the example and the storage device according to the present invention also allow a small article having been inserted into the gap between the lid member 3 and the cover member 5 to be recovered.

As described above, in order to inhibit a small article from being inserted into a gap between the lid member 3 and the cover member 5 and in order to sweep a small article having been inserted into the gap by using the projecting tooth portions 46 of the fin member 4, sliding contact of the projecting tooth portions 46 of the fin member 4 with the recessed groove portions 55 of the cover member 5 is simply required when the lid member 3 changes between the half-opened position and the opened position.

However, in order to sweep a small article having been inserted into the gap with high efficiency or with high reliability, strong sliding contact of the fin member 4 with the cover member 5 is considered to be necessary.

The position of the fin member 4 changes together with the position of the lid member 3. Therefore, for strong sliding contact of the fin member 4 with the cover member 5, the fin member 4 needs to be urged by the urging member 80 in order to appropriately form the angle θ of the fin member 4 relative to the lid member 3.

Specifically, the angle θ is not greater than 180° at which the fin member 4 is parallel to the lid member 3, more preferably not greater than 110°, and even more preferably not greater than 90°. As described above, in the storage device 1 according to the example, the fin member 4 is urged so as to be disposed at the neutral position at which the angle θ is 85°.

When the angle θ of the fin member 4 relative to the lid member 3 is in the above-described range, a small article is effectively inhibited from being inserted into a gap between the lid member 3 and the cover member 5, and a small article having been inserted into the gap is swept by the projecting tooth portions 46 of the fin member 4 with high efficiency or with high reliability. For example, the lower limit of the angle θ is not particularly limited, but is preferably not less than 10° in practice.

In the storage device 1 according to the example, the lid member 3 rotates biaxially. However, the operation of the lid member 3 in the storage device 1 according to the present invention is not limited thereto. The lid member 3 may rotate uniaxially or may slide. In any case, the lid member 3 is simply required to change between the opened position and the closed position in the front-rear direction and the up-down direction.

In the storage device 1 according to the example, the input portion 41 disposed in the fin member 4 such that the diameter thereof varies, and the urging member 80 for pressing the input portion 41, are used as the urging mechanism for urging the fin member 4 toward the neutral position. However, the urging mechanism is not limited thereto, and may be implemented in various modes. For example, the urging member 80 may be implemented by a turnover spring, and the fin member 4 may be urged by the urging member 80 toward the neutral position at which the angle θ of the fin member 4 relative to the lid member 3 becomes a predetermined angle.

The present invention is not limited to the embodiment described above with reference to the drawings, and modification may be devised as appropriate without departing from the gist of the present invention. Furthermore, components in the description including the embodiment may be optionally taken and combined to be implemented.

The storage device 1 of the present invention is represented as follows.

[1]

The storage device 1 including:

the case member 2 configured to have the article storage portion 22 that is opened upward;

the lid member 3 configured to change, in the leading-back direction and the up-down direction, between a closed position at which the lid member 3 closes the opening 22o of the article storage portion 22 so as to orient the first end portion 31 toward a leading side and orient the second end portion 32 toward a back side opposing the leading side, an opened position at which the lid member 3 is disposed backward of the article storage portion 22 on the back side so as to orient the first end portion 31 upward and orient the second end portion 32 downward, and a half-opened position between the opened position and the closed position;

the fin member 4 configured to have the comb-teeth-like portion 45 in which a plurality of the projecting tooth portions 46 are aligned along the width direction that intersects the leading-back direction and the up-down direction so as to be spaced from each other, and to be pivotally supported on the second end portion 32 of the lid member 3;

the cover member 5 configured to be positioned so as to be fixed relative to the case member 2, to have a plurality of the recessed groove portions 55 that mesh with the projecting tooth portions 46, and to be disposed backward of the lid member 3 on the back side; and the urging member 80 configured to be disposed in the lid member 3 and to urge the fin member 4, in which, when the lid member 3 changes between the half-opened position and the opened position, the projecting tooth portions 46 of the fin member 4 are in sliding contact with the recessed groove portions 55 of the cover member 5 by urging force of the urging member 80.

[2]

The storage device 1 described in [1], in which the urging member 80 urges the fin member 4 toward the neutral position at which the angle θ of the fin member 4 relative to the lid member 3 is a predetermined angle that is not greater than 110°.

The invention claimed is:

1. A storage device comprising:
a case member configured to have an article storage portion that is opened upward;
a lid member configured to change, in a leading-back direction and an up-down direction, between a closed position at which the lid member closes an opening of the article storage portion so as to orient a first end portion toward a leading side and orient a second end portion toward a back side opposing the leading side, an opened position at which the lid member is disposed backward of the article storage portion on the back side so as to orient the first end portion upward and orient the second end portion downward, and a half-opened position between the opened position and the closed position;
a fin member configured to have a comb-teeth portion in which a plurality of projecting tooth portions are aligned along a width direction that intersects the leading-back direction and the up-down direction so as to be spaced from each other, and to be pivotally supported on the second end portion of the lid member;
a cover member configured to be positioned so as to be fixed relative to the case member, to have a plurality of recessed groove portions that mesh with the projecting tooth portions, and to be disposed backward of the lid member on the back side; and
an urging member fixed to the lid member and configured to urge the fin member, wherein,
when the lid member changes between the half-opened position and the opened position, the projecting tooth portions of the fin member are in sliding contact with the recessed groove portions of the cover member by urging force of the urging member;
the fin member is configured to have a shaft portion that is pivotally supported on the lid member, and an input portion that projects in a direction that intersects with the shaft portion and is oriented toward a side opposite to the projecting tooth portions;
a distance from the shaft portion to the surface of the input portion is different for each portion of the input portion in a circumferential direction around the shaft portion;
the urging member is configured to have an urging portion that is compressed to accumulate urging force and extends to release the urging force and a pressing surface that is integrated with the urging portion and presses the input portion; and
the fin member is configured to be urged by the urging member toward a neutral position in which the pressing surface of the urging member contacts with a neutral input portion that is a portion on the surface of the input portion where a distance from the shaft portion is minimized.

2. The storage device according to claim 1, wherein the urging member urges the fin member toward the neutral position at which an angle θ of the fin member relative to the lid member is a predetermined angle that is not greater than 110°.

\* \* \* \* \*